UNITED STATES PATENT OFFICE.

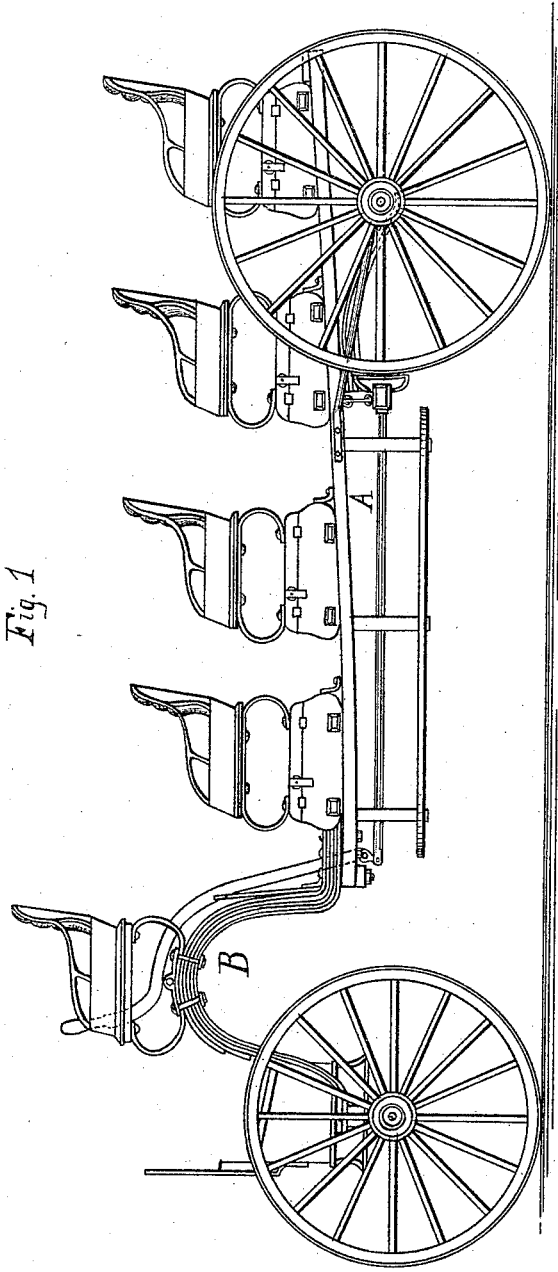

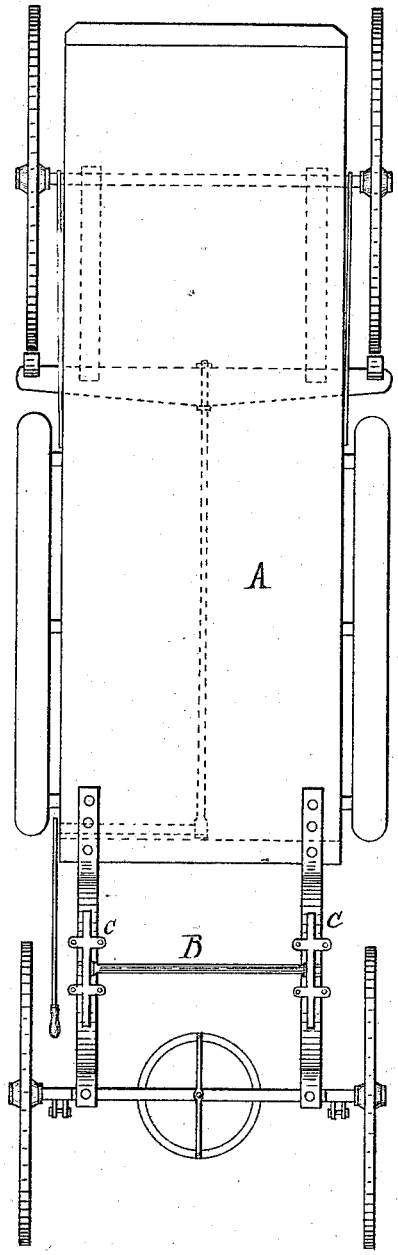

JAMES A. BURDEN, OF TROY, NEW YORK.

BUCKBOARD-WAGON.

SPECIFICATION forming part of Letters Patent No. 344,895, dated July 6, 1886.

Application filed February 13, 1886. Serial No. 191,817. (No model.)

*To all whom it may concern:*

Be it known that I, JAMES A. BURDEN, of the city of Troy, in the county of Rensselaer and State of New York, have made a new and useful Improvement in Buckboards, of which the following is a specification, reference being had to the accompanying drawings, in which—

Figure 1 is a side view of a buckboard containing my improvement, and Fig. 2 is a top view or plan of the same.

Like letters refer to corresponding parts.

To enable those skilled in the art to which it relates to construct my said invention, I give the following description thereof.

In mountainous parts of the country where the class of vehicles to which my improvements relate are generally used it is very difficult to turn them around, for as they are usually constructed the spring-board upon which the seats are placed is made to extend to the head-block and so as to be between the front wheels, thus rendering it impossible to "cramp" the vehicle to any extent for the purpose of turning it. The consequence is that very frequently the driver is compelled to go a long distance to find a level spot of sufficient area to permit turning the vehicle around, which ofttimes is a matter of great inconvenience. To remedy this difficulty in the construction of this class of vehicles is the object of my invention and improvement.

The letter A designates the spring-board of the vehicle, which at its rear end is attached to the hind axle, and at its front end is connected with the head-block by means of the "crane-neck" from braces $c$ $c$, so that the spring-board does not extend to the head-block, as in the older vehicles of the class upon which my invention is an improvement. These crane-neck braces or bars, each having the upwardly-curved recess B made therein, permit the wheels to run under them, so that the vehicle can be easily turned. With these curved or crane-neck bars or braces I combine the driver's seat, which is placed upon their upcurve, which conveniently raises the driver's seat where he can better see the road and manage the team.

Upon the spring-board proper I arrange a series of seats, which in the vehicle shown contains five, although a greater or less number may be used.

I am aware that the crane-neck braces or bars which I employ, considered apart from the connection in which I use them, are not new.

What I claim as new, and desire to secure by Letters Patent, is—

The combination, with the spring-board A, adapted to rest on the rear axle, and provided with seats arranged thereon, of the crane-neck braces or bars $c$ $c$, connecting said spring-board with the head-block, and the driver's seat arranged on said braces, substantially as and for the purposes set forth.

Signed at Troy, New York, this 5th day of January, 1886, and in the presence of the two witnesses whose names are hereto written.

JAS. A. BURDEN.

Witnesses:
 ESEK COWEN,
 NICHOLAS J. GABLE.